(12) United States Patent
Hirota et al.

(10) Patent No.: US 10,590,210 B2
(45) Date of Patent: Mar. 17, 2020

(54) METHOD FOR PRODUCING CHLORINATED VINYL CHLORIDE RESIN

(71) Applicant: KANEKA CORPORATION, Osaka (JP)

(72) Inventors: Junichi Hirota, Hyogo (JP); Yoshito Takeuchi, Hyogo (JP); Naoki Deguchi, Hyogo (JP)

(73) Assignee: KANEKA CORPORATION, Osaka (JP)

(*) Notice: Subject to any disclaimer, the term of this patent is extended or adjusted under 35 U.S.C. 154(b) by 0 days.

(21) Appl. No.: 16/108,421

(22) Filed: Aug. 22, 2018

(65) Prior Publication Data

US 2018/0355081 A1 Dec. 13, 2018

Related U.S. Application Data

(63) Continuation of application No. PCT/JP2017/005274, filed on Feb. 14, 2017.

(30) Foreign Application Priority Data

Feb. 25, 2016 (JP) ................. 2016-034204
Feb. 25, 2016 (JP) ................. 2016-034208

(51) Int. Cl.
| | | |
|---|---|---|
| *C08F 2/46* | (2006.01) | |
| *C08F 2/50* | (2006.01) | |
| *C08G 61/04* | (2006.01) | |
| *C08F 14/06* | (2006.01) | |
| *C08L 27/24* | (2006.01) | |
| *C08K 3/34* | (2006.01) | |
| *C08F 8/22* | (2006.01) | |
| *C08K 3/04* | (2006.01) | |
| *C08K 3/36* | (2006.01) | |

(52) U.S. Cl.
CPC ............... *C08F 14/06* (2013.01); *C08F 8/22* (2013.01); *C08K 3/04* (2013.01); *C08K 3/34* (2013.01); *C08K 3/36* (2013.01); *C08L 27/24* (2013.01); *C08K 2201/005* (2013.01)

(58) Field of Classification Search
CPC .... C08F 14/06; C08F 8/22; C08F 3/04; C08F 3/34; C08F 3/36; C08F 114/06; C08L 27/24; C08L 27/06; C08K 3/04; C08K 2201/005; C08K 3/36
USPC .......................... 522/132, 131, 113, 1; 520/1
See application file for complete search history.

(56) References Cited

U.S. PATENT DOCUMENTS

| | | | |
|---|---|---|---|
| 3,887,533 A * | 6/1975 | Mukerjee | C08F 8/22 525/357 |
| 5,912,277 A | 6/1999 | Detterman | |
| 6,590,041 B1 * | 7/2003 | Eguchi | C08F 8/20 525/331.6 |
| 2007/0043170 A1 | 2/2007 | Suzuki | |
| 2007/0173611 A1 | 7/2007 | Yoshimi et al. | |
| 2010/0063247 A1 | 3/2010 | Sanni et al. | |
| 2015/0005455 A1 | 1/2015 | Harada | |

FOREIGN PATENT DOCUMENTS

| | | |
|---|---|---|
| JP | H11-158221 A | 6/1999 |
| JP | 2002-275213 A | 9/2002 |
| JP | 2002-308930 A | 10/2002 |
| JP | 2002-317010 A | 10/2002 |
| JP | 2002-317011 A | 10/2002 |
| JP | 2003-183320 A | 7/2003 |
| JP | 2003-277436 A | 10/2003 |
| JP | 2006-328166 A | 12/2006 |
| WO | 2004/096908 A1 | 11/2004 |
| WO | 2008/062526 A1 | 5/2008 |
| WO | 2013/081133 A1 | 6/2013 |

OTHER PUBLICATIONS

International Search Report issued in International Application No. PCT/JP2017/005274, dated Mar. 21, 2017 (2 pages).

* cited by examiner

*Primary Examiner* — Jessica Whiteley
(74) *Attorney, Agent, or Firm* — Osha Liang LLP

(57) ABSTRACT

A method for producing chlorinated polyvinyl chloride includes bringing chlorine gas into contact with a mixture comprising a polyvinyl chloride powder and at least one inorganic filler; and irradiating the mixture with UV light to perform a chlorination reaction. At least one inorganic filler is selected from the group consisting of silica, carbon black, and talc.

7 Claims, 3 Drawing Sheets

METHOD FOR PRODUCING CHLORINATED VINYL CHLORIDE RESIN

TECHNICAL FIELD

One or more embodiments of the present invention relate to a method for producing chlorinated polyvinyl chloride. One or more embodiments of the present invention relate to a method for producing chlorinated polyvinyl chloride that includes bringing chlorine gas into contact with a polyvinyl chloride powder and irradiating the polyvinyl chloride powder with UV light to perform a chlorination reaction.

BACKGROUND

Chlorinated polyvinyl chloride is produced by chlorination of polyvinyl chloride and has a higher heat resistant temperature than the polyvinyl chloride. Therefore, the chlorinated polyvinyl chloride is used in various fields such as heat-resistant pipes, heat-resistant industrial boards, heat-resistant films, and heat-resistant sheets.

The synthesis of the chlorinated polyvinyl chloride may be performed by the following methods: one method includes suspending a polyvinyl chloride powder in an aqueous medium to form an aqueous suspension and chlorinating polyvinyl chloride while supplying chlorine to the aqueous suspension, and another method includes bringing a polyvinyl chloride powder and chlorine into contact with each other to react (e.g., Patent Documents 1 to 4).
Patent Document 1: JP 2002-275213 A
Patent Document 2: JP 2002-308930 A
Patent Document 3: JP 2002-317010 A
Patent Document 4: JP 2002-317011 A To achieve large-scale production of chlorinated polyvinyl chloride by the method that includes bringing a polyvinyl chloride powder and chlorine into contact with each other to react, the productivity should be improved.

SUMMARY

One or more embodiments of the present invention provide a method for producing chlorinated polyvinyl chloride with high productivity. The method includes bringing chlorine gas into contact with a polyvinyl chloride powder and irradiating the polyvinyl chloride powder with UV light to perform a chlorination reaction.

One or more embodiments of the present invention relate to a method for producing chlorinated polyvinyl chloride that includes bringing chlorine gas into contact with a polyvinyl chloride powder and irradiating the polyvinyl chloride powder with UV light to perform a chlorination reaction. The polyvinyl chloride powder is mixed with at least one inorganic filler selected from the group consisting of silica, carbon black and talc.

In one or more embodiments, it may be preferable that 0.001 to 1 parts by weight of the inorganic filler is mixed with respect to 100 parts by weight of the polyvinyl chloride powder.

The inorganic filler may be at least one selected from the group consisting of silica and carbon black that have a mean particle size of 1 to 500 nm. Moreover, the inorganic filler may be talc that has a mean particle size of 500 to 5000 nm.

In one or more embodiments, it may be preferable that the polyvinyl chloride powder has a mean particle size of 25 to 2500 μm.

In one or more embodiments, it may be preferable that the chlorination reaction is performed using a fluidized bed reactor.

The method for producing chlorinated polyvinyl chloride according to one or more embodiments of the present invention can provide chlorinated polyvinyl chloride with high productivity.

DETAILED DESCRIPTION OF EMBODIMENTS

Figure 1:
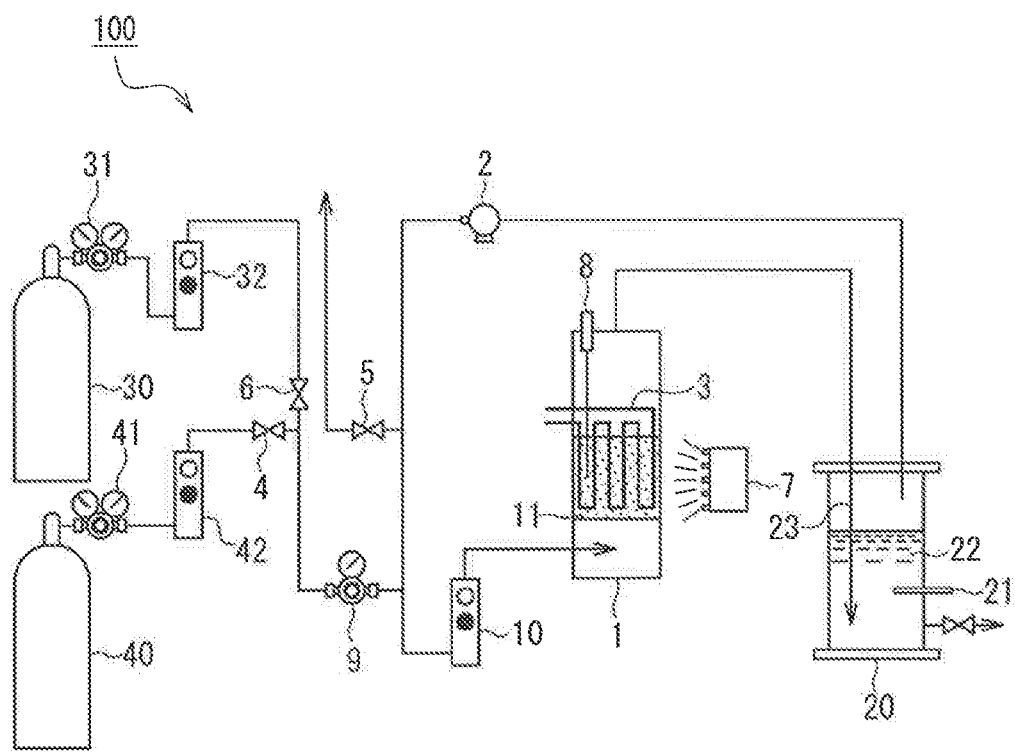
FIG. 1 is a schematic cross-sectional side view of an apparatus for producing chlorinated polyvinyl chloride.

The present inventors conducted intensive studies to improve productivity in the production of chlorinated polyvinyl chloride by bringing chlorine gas into contact with powdered polyvinyl chloride and irradiating the powdered polyvinyl chloride with UV light to perform a chlorination reaction. As a result, the present inventors surprisingly found that the productivity was improved when the chlorination reaction was performed by bringing chlorine gas into contact with a polyvinyl chloride powder that was mixed with at least one inorganic filler selected from the group consisting of silica, carbon black, and talc. Specifically the present inventors found that the reaction time required to reach a predetermined chlorination reaction rate was reduced when the chlorination reaction was performed by bringing the chlorine gas into contact with the polyvinyl chloride powder that was mixed with at least one inorganic filler selected from the group consisting of silica, carbon black, and talc, as compared to the case where the polyvinyl chloride powder was not mixed with an inorganic filler, provided that the other conditions of the chlorination reaction were the same. Although the mechanism for improving the productivity is still unclear, the present inventors observed a reaction apparatus after performing the chlorination reaction, and confirmed that the amount of resin adhering to the inside of the reaction apparatus, including the surface of a UV light source and the inner wall of a reactor, was significantly reduced when the polyvinyl chloride powder was mixed with at least one inorganic filler selected from the group consisting of silica, carbon black, and talc, as compared to the case where the polyvinyl chloride powder was used directly. This phenomenon indicates that at least one inorganic filler selected from the group consisting of silica, carbon black, and talc would reduce the adhesion of the polyvinyl chloride powder to the surface of the light source, which may result in a higher chlorination reaction rate and a shorter reaction time. Moreover, since the amount of resin adhering to the inside of the reaction apparatus is reduced, the frequency of cleaning of the reaction apparatus can also be reduced.

In one or more embodiments of the present invention, the polyvinyl chloride powder needs to be mixed with at least one inorganic filler selected from the group consisting of silica, carbon black, and talc before the chlorination reaction. The inorganic filler such as silica, carbon black, or talc is generally added to a resin composition during, e.g., a molding process in order to improve the physical properties and to serve as a bulking agent, a pigment, or the like. Surprisingly, in one or more embodiments of the present invention, unlike the conventional use of the inorganic filler, the polyvinyl chloride powder that has been mixed with at least one inorganic filler selected from the group consisting of silica, carbon black, and talc undergoes the chlorination reaction. Consequently, the reaction time of the chlorination reaction is reduced and the productivity is improved, as compared to the case where the polyvinyl chloride powder is used alone.

In one or more embodiments, it may be preferable that 0.001 to 1 parts by weight of the inorganic filler, i.e., at least one inorganic filler selected from the group consisting of silica, carbon black, and talc is mixed with respect to 100 parts by weight of the polyvinyl chloride powder. When the inorganic filler is talc, it may be more preferable that 0.005 to 1 parts by weight of the inorganic filler is mixed with respect to 100 parts by weight of the polyvinyl chloride powder. From the viewpoint of making it easier to reduce the reaction time of the chlorination reaction, the amount of at least one inorganic filler selected from the group consisting of silica, carbon black, and talc may be preferably 0.01 parts by weight or more, more preferably 0.02 parts by weight or more, even more preferably 0.03 parts by weight or more, and further preferably 0.05 parts by weight or more with respect to 100 parts by weight of the polyvinyl chloride powder. From the viewpoint of reducing the cost, the amount of the at least one inorganic filler may be preferably 0.75 parts by weight or less, and more preferably 0.5 parts by weight or less with respect to 100 parts by weight of the polyvinyl chloride powder.

When the inorganic filler is silica and/or carbon black, the inorganic filler may be a nanofiller. From the viewpoint of making it easier to mix the inorganic filler with the polyvinyl chloride powder and to reduce the reaction time, the mean particle size of the silica and/or carbon black may be preferably 500 nm or less, more preferably 100 nm or less, even more preferably 50 nm or less, and further preferably 40 nm or less. From the viewpoint of the handling properties during mixing, the mean particle size of the silica and/or carbon black may be 1 nm or more. In one or more embodiments of the present invention, the mean particle size of the silica or carbon black indicates a particle size at 50% in the cumulative particle size distribution based on volume, which is obtained by dispersing a powder of silica or carbon black in water and measuring it with a dynamic light scattering particle size distribution analyzer.

When the inorganic filler is talc, from the viewpoint of making it easier to mix the inorganic filler with the polyvinyl chloride powder and to reduce the reaction time, the mean particle size of the talc may be preferably 5000 nm or less, more preferably 2000 nm or less, even more preferably 1500 nm or less, and further preferably 1200 nm or less. From the viewpoint of the handling properties during mixing, the mean particle size of the talc may be preferably 500 nm or more. In one or more embodiments of the present invention, the mean particle size of the talc indicates a particle size at 50% in the cumulative particle size distribution based on volume, which is obtained by dispersing a powder of talc in water and measuring it with a laser diffraction/scattering particle size distribution analyzer at a refractive index of 1.57.

The silica is not particularly limited and may be selected from commercially available products such as "YC010C-SP3", "YA050C-SP3", "YC100C-SP3" and "SC2500-SQ" manufactured by Admatechs Company Limited. The carbon black is not particularly limited and may be selected from commercially available products such as "MA10" manufactured by Mitsubishi Chemical Corporation. The talc is not particularly limited and may be selected from commercially available products such as "D-800", "FG-15" and "P-3" manufactured by Nippon Talc Co., Ltd., and "FH105" and "FG105" manufactured by Fuji Talc Industrial Co., Ltd.

A method for mixing the polyvinyl chloride powder and the inorganic filler is not particularly limited. For example, they may be mixed manually or by a ball mill or any device that is generally used for mixing powders. Specifically examples of the mixing device include the following: container rotation type devices such as a horizontal cylinder mixer, a V type mixer, a double cone mixer, and a rocking and rotating mixer; and mechanical agitation type devices such as a single-shaft ribbon mixer, a double-shaft paddle mixer, a rotary plow mixer, a double-shaft planetary stirring mixer, and a conical screw mixer. The specific shapes of these devices are described in Chemical Engineering Handbook (edited by The Society of Chemical Engineers, Japan, revised 6th edition, p. 876).

In one or more embodiments of the present invention, the particle size of the polyvinyl chloride powder is not particularly limited. From the viewpoint of enhancing the fluidity of the polyvinyl chloride powder and the viewpoint of allowing the chlorination reaction to proceed uniformly e.g., the mean particle size may be preferably 25 to 2500 µm, and more preferably 35 to 1500 µm. The particle size distribution of the polyvinyl chloride powder is also not particularly limited. From the viewpoint of enhancing the fluidity of the polyvinyl chloride powder and the viewpoint of allowing the chlorination reaction to proceed uniformly, the particle size distribution may be preferably in the range of 0.01 to 3000 µm, and more preferably in the range of 10 to 2000 µm. In one or more embodiments of the present invention, the mean particle size and the particle size distribution of the polyvinyl chloride powder may be determined in the following manner. The polyvinyl chloride powder is dispersed in water and then measured by a laser diffraction/scattering particle size distribution analyzer (LA-950, manufactured by HORIBA, Ltd.) at a refractive index of 1.54. In the present specification, the polyvinyl chloride powder charged in a reactor for performing the chlorination reaction is also referred to as a powder layer. Hereinafter, unless otherwise specified, the term "reactor" means a reactor for performing the chlorination reaction.

The polyvinyl chloride may be either a homopolymer of vinyl chloride monomers or a copolymer of a vinyl chloride monomer and another copolymerizable monomer. Examples of another copolymerizable monomer include, but are not limited to, ethylene, propylene, vinyl acetate, allyl chloride, allyl glycidyl ether, acrylate ester, and vinyl ether.

The polyvinyl chloride may be in powder form during the chlorination reaction, and the method for producing the polyvinyl chloride is not particularly limited. For example, the polyvinyl chloride may be produced by any of the methods such as a suspension polymerization method, a bulk polymerization method, a gas phase polymerization method, and an emulsion polymerization method. In one or more embodiments, it may be preferable that the polyvinyl chloride is adjusted to fall within the above particle size range before the chlorination reaction.

In one or more embodiments of the present invention, chlorine is not particularly limited as long as it is generally used for industrial purposes. Moreover chlorine may be diluted with gas other than chlorine to control the reaction rate and reaction temperature of the chlorination reaction. However, it may be preferable that chlorine is diluted with inert gas such as nitrogen or argon.

In one or more embodiments of the present invention, the state of chlorine that is supplied to the reactor for performing the chlorination reaction may be gas or liquid. The chlorine used for industrial purposes is usually liquid chlorine contained in a high pressure cylinder. Therefore, when chlorine is supplied as gas, the liquid chlorine taken out of the cylinder may be vaporized in a separate container and then supplied to the reactor. When liquid chlorine is supplied to the reactor, the liquid chlorine fed from the cylinder may be vaporized in the reactor. The vaporization of chlorine in the reactor may be preferred because the heat of reaction is removed by the heat of vaporization, thus lowering the temperature rise in the reaction apparatus. From the viewpoint of preventing changes in the surface structure and internal structure of the polyvinyl chloride, the liquid chlorine needs to be vaporized in the reactor and then brought into contact with the polyvinyl chloride. During the chlorination reaction, chlorine may be supplied continuously or intermittently.

In one or more embodiments of the present invention, the chlorine gas of the raw material may be supplied from, e.g., a chlorine gas cylinder. In addition to this, chlorine contained in emission gas that is discharged from the reactor may also be used. Specifically since the emission gas contains hydrogen chloride and chlorine, the hydrogen chloride is removed from the emission gas, and the chlorine thus obtained is returned to the reactor through a circulation circuit. The hydrogen chloride may be removed by, e.g., a method in which the hydrogen chloride is absorbed by an absorption liquid contained in an absorption bottle as the emission gas passes through the absorption bottle, or a method in which the hydrogen chloride is absorbed by an absorption liquid as the emission gas passes through a general exhaust gas washing tower such as a packed tower or a spray tower. These methods can use any absorption liquid that selectively absorbs the hydrogen chloride. By utilizing the property that hydrogen chloride is very easy to dissolve in water compared to chlorine, water may be used as the absorption liquid due to its low cost and convenience.

In one or more embodiments of the present invention, when the chlorine gas is brought into contact with the polyvinyl chloride powder, it may be preferable that the polyvinyl chloride powder flows in the reactor for performing the chlorination reaction. Since the polyvinyl chloride powder is not at rest but moves in the reactor, the contact between the gaseous chlorine and the powder particles of the polyvinyl chloride is improved. From the viewpoint of making it easier to fluidize the polyvinyl chloride powder, a fluidized bed reactor may be used. The fluidized bed reactor includes a fluidized bed in which a gas flows through the powder layer of the polyvinyl chloride powder to move the powder particles. When the fluidized bed is used, the gas flow rate may be 0.02 m/s or more from the viewpoint of fluidizing the powder uniformly, and the gas flow rate may be 0.5 m/s or less from the viewpoint of preventing the powder particles from scattering. In addition to the fluidized bed, a method employed in a conventional powder reaction apparatus may be used. Alternatively a method employed in, e.g., a mixing device, a stirring device, a combustion device, a drying device, a pulverizer, or a granulator may be applied.

Specifically, the container rotation type devices such as a horizontal cylinder mixer, a V type mixer, a double cone mixer, and a rocking and rotating mixer or the mechanical agitation type devices such as a single-shaft ribbon mixer, a double-shaft paddle mixer, a rotary plow mixer, a double-shaft planetary stirring mixer, and a conical screw mixer may be used. The specific shapes of these devices are described in Chemical Engineering Handbook (edited by The Society of Chemical Engineers, Japan revised 6th edition, p. 876).

In one or more embodiments of the present invention, the role of UV light is to excite chlorine and to generate chlorine radicals, thereby promoting the addition reaction of chlorine to the polyvinyl chloride. Chlorine has a strong absorption band for the UV light in the wavelength range of 280 to 420 nm. Therefore, in one or more embodiments, it may be preferable that the chlorination reaction is performed by irradiating the polyvinyl chloride powder with the UV light in the wavelength range of 280 to 420 nm while the polyvinyl chloride powder is in contact with the chlorine gas. The UV light to be emitted may contain light having a wavelength of less than 280 nm or light having a wavelength of more than 420 nm. However, from the viewpoint of energy efficiency a light source that emits a large amount of the UV light in the wavelength range of 280 to 420 nm may be used. Specific examples of the light source include a low pressure mercury lamp, a high pressure mercury lamp, an ultra-high pressure mercury lamp, a metal halide lamp, a UV LED, an organic EL, and an inorganic EL In the spectral radiant energy distribution of the light source to be used, the total of the radiant energy (J) in the wavelength range of 280 to 420 nm may be preferably 20% or more, more preferably 60% or more, and further preferably 80% or more of the total of the radiant energy (J) in the wavelength range of 150 to 600 nm. In one or more embodiments, it may be preferable that the total of the radiant energy (J) in the wavelength range of 280 to 420 nm is 100%, i.e., the light source emits only the UV light in the wavelength range of 280 to 420 nm. In particular, from the viewpoint of being able to emit the UV light that is close to a single wavelength with a narrow wavelength range for irradiation, the light source may be preferably at least one selected from the group consisting of a UV LED, an organic EL, and an inorganic EL. The light source may be arranged in a protective container depending on the purpose of protection, cooling, etc. of the light source. The protective container for the light source may be made of any material that does not interfere with the emission of UV light from the light source. For example, materials such as quartz, Pyrex (registered trademark) glass, hard glass, and soft glass may be used for the protective container. Among these materials, quartz or Pyrex (registered trademark) glass may be preferred in order to effectively utilize the wavelength in the UV range that is effective for the chlorination reaction. In one or more embodiments of the present invention, the chlorination reaction is initiated by starting UV irradiation and terminated by ending the UV irradiation. Specifically, the chlorination reaction is initiated by turning on a light source that emits UV light, and the chlorination reaction is terminated by turning off the light source. In one or more embodiments of the present invention, when the UV irradiation is performed continuously during the chlorination reaction, the reaction time of the chlorination reaction is the same as the irradiation time of the UV light. On the other hand, when the UV irradiation is performed intermittently during the chlorination reaction, the reaction time of the chlorination reaction is the sum of the period of time in which the light source emits UV light and the period of time in which the light source is not operated. However, the chlorination reaction itself proceeds only when the UV irradiation is actually performed.

One or more embodiments of the present invention can use any UV light source that irradiates the polyvinyl chloride powder with UV light. The number of light sources also is not limited and may be one or more than one. A method for installing the light source is not particularly limited. The light source may be placed outside the reactor, may be placed inside the reactor, or may be placed both outside and inside the reactor. When the light source is placed inside the reactor, the whole or a part of the light source may be inserted into the powder layer of the polyvinyl chloride. From the viewpoint of preventing corrosion due to chlorine, it may be preferable that the light source that has been arranged in the protective container is placed inside the reactor. For example, if the reactor for performing the chlorination reaction has a small size, the UV irradiation from the outside of the powder layer or from the outside of the reactor will be efficient because the light receiving area of the polyvinyl chloride is likely to be larger. On the other hand, if the size of the reactor is increased to perform the chlorination reaction on a commercial scale, from the viewpoint of efficiently irradiating the polyvinyl chloride with UV light, it may be preferable that the light source is inserted into the powder layer, and it may be more preferable that two or more light sources are inserted into the powder layer.

In one or more embodiments of the present invention, the irradiation intensity of UV light is not particularly limited as long as it falls within the range where the chlorination reaction can be performed. For example, from the viewpoint of improving the quality such as static stability of the chlorinated polyvinyl chloride thus obtained, the irradiation intensity of the UV light in the wavelength range of 280 to 420 nm during the chlorination reaction of the polyvinyl chloride may be 0.0005 to 7.0 W per kg of the polyvinyl chloride powder (i.e., 0.0005 to 7.0 W/kg). In the present specification, unless otherwise specified, the "irradiation intensity of the UV light" means the irradiation intensity of the UV light in the wavelength range of 280 to 420 nm. The irradiation intensity of the UV light per kg of the polyvinyl chloride powder may be more preferably 0.0005 W or more and 7.0 W or less even more preferably 0.0005 W or more and 5.0 W or less, still more preferably 0.0005 W or more and 3 W or less, much more preferably 0.0005 W or more and 1.50 W or less, and further preferably 0.0005 W or more and 1.0 W or less.

Figure 3:
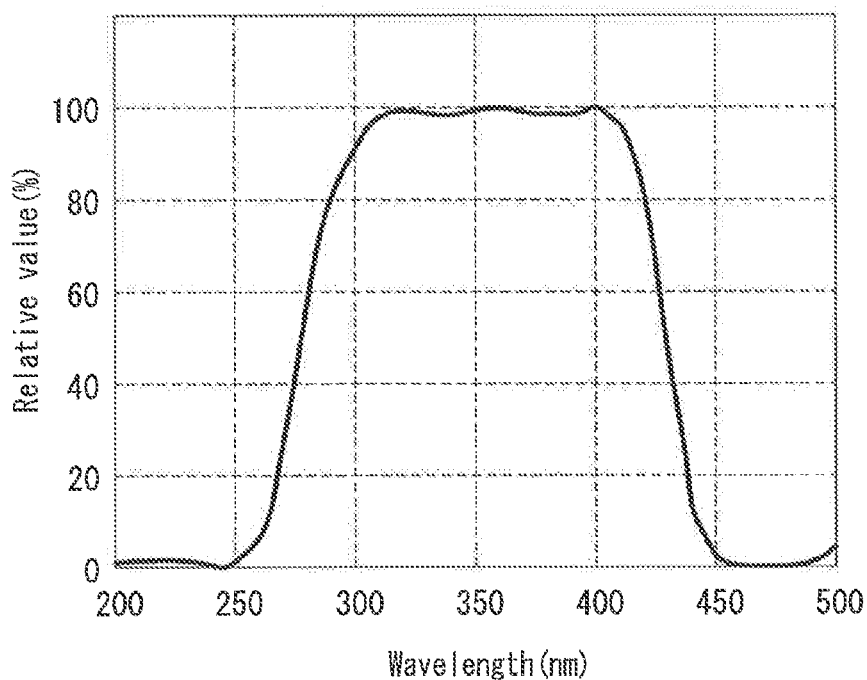
FIG. 3 is a graph showing the relative spectral responsivity of a sensor in a UV power meter (controller: C9536-02, sensor: H9958-02, manufactured by Hamamatsu Photonics KK) used for the measurement of the irradiation intensity of UV light.

In one or more embodiments of the present invention, the "irradiation intensity of the UV light per kg of the polyvinyl chloride powder" is measured and calculated as follows. As described above, the irradiation intensity of the UV light in one or more embodiments of the present invention means the irradiation intensity of the UV light in the wavelength range of 280 to 420 nm. In one or more embodiments of the present invention uses a UV power meter (controller: C9536-02, sensor: H9958-02) manufactured by Hamamatsu Photonics KK to measure the irradiation intensity of the UV light. FIG. 3 shows the relative spectral response characteristics of the sensor (H9958-02). In one or more embodiments of the present invention, the irradiation intensity of the UV light is measured, in principle, by the UV power meter (controller: C9536-02, sensor: H9958-02) manufactured by Hamamatsu Photonics K.K. However, if this UV power meter is not available, data may be measured by another instrument for measuring the irradiation intensity of the UV light, and then the data may be corrected based on the relative spectral response characteristics of the sensor shown in FIG. 3. Thus, the irradiation intensity of the UV light can similarly be calculated.

(1) An irradiation area of the UV light is measured. When a light source is placed outside the reactor, a region that is irradiated with the UV light from the light source is determined at the position of the inner wall of the reactor, and the area of the region is taken as the irradiation area ($cm^2$) of the UV light. For example, when an apparatus illustrated in FIG. 1 is used, a region that is irradiated with the UV light from a UV LED light source (i.e., a region where a UV light intensity of 10 $\mu W/cm^2$ or more can be detected) is determined at the position of the inner wall of a reactor, and the area of the region is measured by using the UV power meter (controller: C9536-02, sensor: H9958-02, manufactured by Hamamatsu Photonics KK). When a light source is placed inside the reactor, a region that is irradiated with the UV light from the light source is determined at the position of the outer surface of the light source, and the area of the region is taken as the irradiation area ($cm^2$) of the UV light. Alternatively, when a light source is arranged in the protective container, a region that is irradiated with the UV light from the light source is determined at the position of the outer surface of the protective container, and the area of the region is taken as the irradiation area ($cm^2$) of the UV light.

(2) The irradiation area of the UV light is divided into sections, each of which has an area of 1 square centimeter (1 $cm^2$), and the irradiation intensity in each of the divided sections is measured. If a section of less than 1 $cm^2$ still remains after the division of the irradiation area into 1 $cm^2$ sections, the irradiation intensity in that section is also measured. Specifically, using the UV power meter (controller: C9536-02, sensor: H9958-02, manufactured by Hamamatsu Photonics KK), the sensor is located so that the center of each of the divided sections and the center of the sensor overlap each other, and the irradiation intensity per unit area ($W/cm^2$) of the UV light in the wavelength range of 280 to 420 nm is measured. Then, the arithmetic mean value of the irradiation intensities in all the divided sections is taken as the irradiation intensity per unit area in one or more embodiments of the present invention. For example, when the apparatus illustrated in FIG. 1 is used, the irradiation intensity per unit area ($W/cm^2$) of the UV light is measured for each of the 1 $cm^2$ sections in the corresponding position of the inner wall of the reactor 1, and then the arithmetic mean value of the resulting irradiation intensities is determined. In this case, the irradiation intensity per unit area of the UV light from the light source is measured in an air atmosphere under the condition that the reactor is empty.

(3) The irradiation area ($cm^2$) of the UV light per kg of the polyvinyl chloride powder is calculated by dividing the irradiation area of the UV light by the value (i.e., the weight of the polyvinyl chloride powder) that is obtained by subtracting the weight of the inorganic filler added from the total weight (kg) of a mixture containing the polyvinyl chloride powder and the inorganic filler, which is the raw material charged in the reactor.

(4) The irradiation intensity (W) of the UV light per kg of the polyvinyl chloride powder is calculated by multiplying the irradiation intensity per unit area ($W/cm^2$) of the UV light (as described in item (2)) by the irradiation area ($cm^2$) of the UV light per kg of the polyvinyl chloride powder (as described in item (3)).

The temperature in the reactor for performing the chlorination reaction of the polyvinyl chloride is not particularly limited. From the viewpoint of preventing the degradation of the polyvinyl chloride and the staining of the chlorinated polyvinyl chloride as well as facilitating the flow of the polyvinyl chloride, the temperature in the reactor may be preferably 10 to 100° C., and more preferably 25 to 85° C. Since the chlorination reaction of the polyvinyl chloride is an exothermic reaction, it may be preferable that heat is removed from the powder layer so as to maintain the temperature in the reactor within the above range. The heating or heat removal of the powder layer can be performed, e.g., by passing hot water or cooling water through a heat exchanger tube located in the reactor.

In many cases, the chlorinated polyvinyl chloride obtained by the chlorination reaction contains unreacted chlorine and by-product hydrogen chloride in the particles and/or on the surface of the particles. Therefore, it may be preferable that such chlorine and hydrogen chloride are removed after the reaction. For example, an air stream cleaning method or a vacuum degassing method may be used to remove chlorine and hydrogen chloride. In the air stream cleaning method, the chlorinated polyvinyl chloride is stirred or a fluidized bed is formed in the container in which gases such as nitrogen, air, argon, and carbon dioxide flow. In the vacuum degassing method, a container containing the chlorinated polyvinyl chloride is vacuum degassed to remove chlorine and hydrogen chloride.

Hereinafter, one or more embodiments of the present invention will be described with reference to the drawings. Using, e.g., the reaction apparatus illustrated in FIG. 1, chlorinated polyvinyl chloride can be produced by bringing chlorine gas into contact with a polyvinyl chloride powder and performing a chlorination reaction under UV irradiation. In the reaction apparatus 100, first, a fluidized bed reactor 1 (in the form of a cylinder with a diameter of 80 mm) made of Pyrex (registered trademark) glass is filled with a mixture 11 of a polyvinyl chloride powder and an inorganic filler. Next, a circulation pump 2 is activated to fluidize the mixture 11 of the polyvinyl chloride powder and the inorganic filler. The circulation flow rate may be 6.0 to 150.7 L/min. The circulation flow rate may be measured by a circulation flowmeter 10. Then, the temperature in the reactor 1 is adjusted to, e.g., 40 to 60° C. with a heat exchanger tube 3 located in the reactor 1. Subsequently a nitrogen supply valve 4 and an exhaust valve 5 are opened so that the atmosphere in the reactor 1 is replaced by 100 vol % of nitrogen, while the internal pressure of the reactor 1 may be adjusted to, e.g., −30 to 50 kPa and 0 to 30 kPa. Thereafter, the nitrogen supply valve 4 is closed and a chlorine supply valve 6 is opened so that the atmosphere in the reactor 1 is replaced by 100 vol % of chlorine gas, while the internal pressure of the reactor 1 may be adjusted to, e.g., −30 to 50 kPa and 0 to 30 kPa. The chlorine is supplied from a chlorine gas cylinder 30 equipped with a pressure regulator 31, and the flow rate of the chlorine is measured by a flowmeter 32. The nitrogen is supplied from a nitrogen gas cylinder 40 equipped with a pressure regulator 41, and the flow rate of the nitrogen is measured by a flowmeter 42. The gas discharged through the exhaust valve 5 is treated in chlorine removal equipment (not shown). Next, a light source 7 is turned on. The light source 7 is installed in a predetermined position outside the reactor 1 and irradiates the polyvinyl chloride powder with UV light. Thus, a chlorination reaction is performed. The irradiation intensity of the UV light per kg of the polyvinyl chloride can be adjusted by the area of a region of the polyvinyl chloride that is irradiated with the UV light, the irradiation intensity per unit area of the UV light, and the total weight of the polyvinyl chloride powder used as the raw material. The temperature in the reactor 1 is continuously measured by a thermocouple 8 and adjusted, although the temperature increases at the start of the chlorination reaction. The temperature in the reactor 1 may be adjusted, e.g., by passing cooling water through the heat exchanger tube 3. Emission gas 23 is discharged from an outlet of the reactor 1 and contains hydrogen chloride and chlorine. The emission gas 23 is transferred to a hydrogen chloride absorption vessel 20 containing water 22. Accordingly the hydrogen chloride is absorbed by the water 22, and the chlorine gas is circulated in a circulation circuit and returned to the reactor 1. The chlorine gas can be automatically replenished through the chlorine supply valve 6 after it has been consumed in the chlorination reaction, while the internal pressure of the reactor 1 is adjusted to a predetermined value with an internal pressure regulating valve 9. When the chlorination reaction rate reaches a predetermined value, the light source 7 is turned off and the chlorination reaction is finished. After the completion of the chlorination reaction, the flow of the chlorine gas is stopped, and the nitrogen supply valve 4 and the exhaust valve 5 are opened so that the atmosphere in the reactor 1 is replaced by nitrogen Consequently, the chlorinated polyvinyl chloride is taken out.

Figure 2:
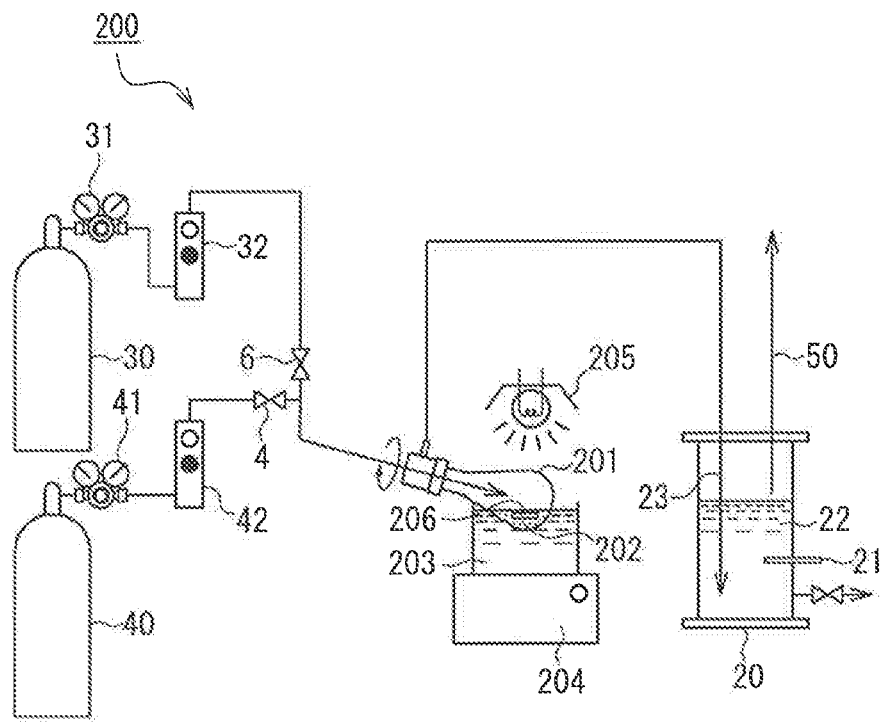
FIG. 2 is a schematic cross-sectional side view of an apparatus for producing chlorinated polyvinyl chloride.
Figure 4:
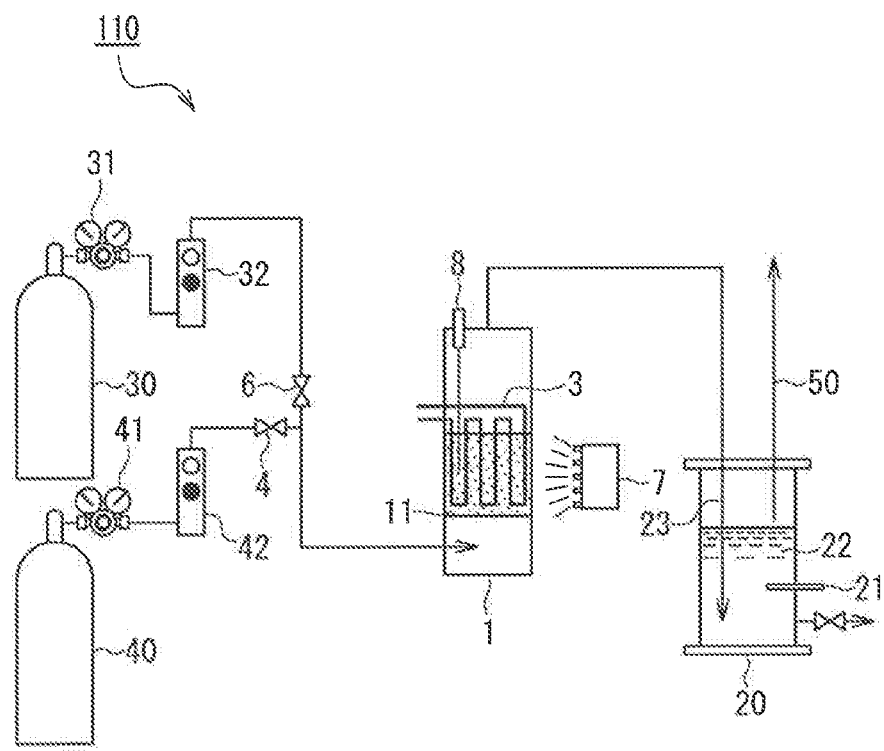
FIG. 4 is a schematic cross-sectional side view of an apparatus for producing chlorinated polyvinyl chloride.
Figure 5:
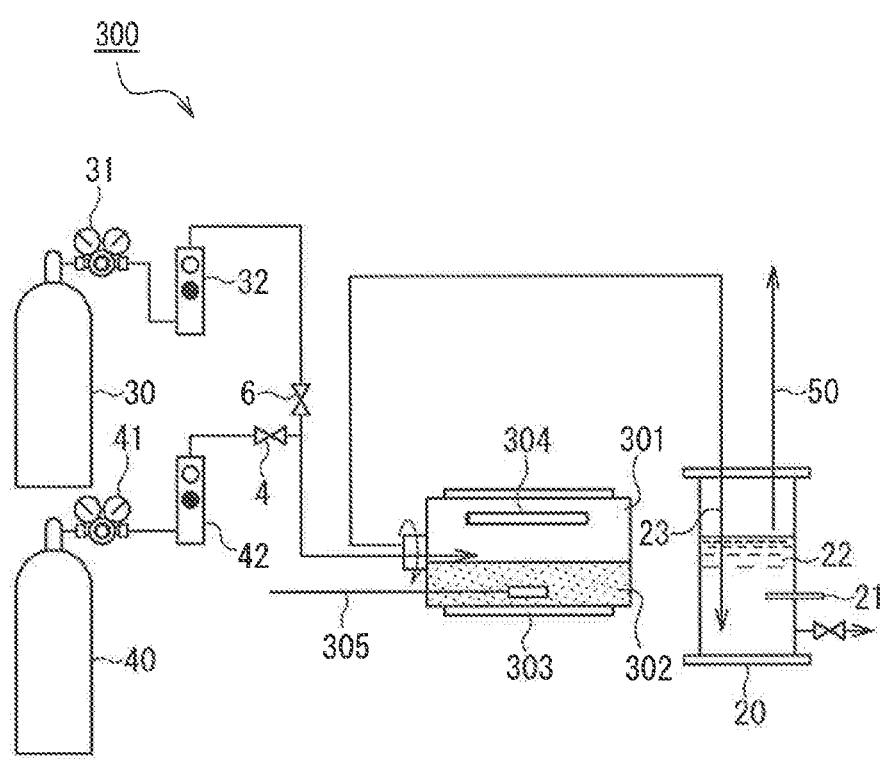
FIG. 5 is a schematic cross-sectional side view of an apparatus for producing chlorinated polyvinyl chloride.

One or more embodiments of the present invention may also use a reaction apparatus as illustrated in FIG. 2. A reaction apparatus 200 in FIG. 2 has the same configuration as the reaction apparatus 100 in FIG. 1 except that the reaction apparatus 200 does not include a circulation circuit through which chlorine gas contained in the emission gas from the reactor is returned to the reactor, and that the reaction apparatus 200 includes a reactor that is rotated by a rotary evaporator instead of the fluidized bed reactor. One or more embodiments of the present invention may also use a reaction apparatus as illustrated in FIG. 4. A reaction apparatus 110 in FIG. 4 has the same configuration as the reaction apparatus 100 in FIG. 1 except that the reaction apparatus 110 does not include a circulation circuit through which chlorine gas contained in the emission gas from the reactor is returned to the reactor. Specifically the reaction apparatus 110 in FIG. 4 has the same configuration as the reaction apparatus 100 in FIG. 1 except that the reaction apparatus 110 does not include the circulation pump 2, the exhaust valve 5, the internal pressure regulating valve 9, and the circulation flowmeter 10. One or more embodiments of the present invention may also use a reaction apparatus as illustrated in FIG. 5. A reaction apparatus 300 in FIG. 5 has the same configuration as the reaction apparatus 200 in FIG. 2 except that a reactor of the reaction apparatus 300 differs from that of the reaction apparatus 200.

In the present specification, the chlorination reaction rate is considered to be 100% when 1 mol (62.5 g) of polyvinyl chloride and 1 mol (71 g) of chlorine react to produce 1 mol (97 g) of chlorinated polyvinyl chloride and 1 mol (36.5 g) of hydrogen chloride. A chlorination reaction rate of 53% means that 62.5 g (1 mol) of polyvinyl chloride and 37.63 g (0.53 mol) of chlorine react to produce 80.785 g of chlorinated polyvinyl chloride and 19.345 g of hydrogen chloride. The weight of the hydrogen chloride produced during the chlorination reaction is measured, and the chlorination reaction rate is calculated based on the weight of the hydrogen chloride and the weight of the polyvinyl chloride used for the chlorination reaction. In this case, the hydrogen chloride produced during the chlorination reaction is absorbed by a predetermined amount of water, and the concentration of the hydrogen chloride in this aqueous solution is measured by an electrical conductivity meter. Therefore, the weight of the hydrogen chloride produced during the chlorination reaction can be calculated based on the concentration of the hydrogen chloride and the weight of the water.

EXAMPLES

One or more embodiments of the present invention will be described in more detail by way of examples and comparative examples. However, the present invention is not limited to the following examples.

Example 1

The reaction apparatus 100 in FIG. 1 was used. First, 0.5 kg (100 parts by weight) of polyvinyl chloride powder was mixed with 25 mg (0.005 parts by weight) of silica (product name: "YC010C-SP3", mean particle size: 10 nm, manufactured by Admatechs Company Limited) as an inorganic filler. The mixture was filled in the fluidized bed reactor 1 (in the form of a cylinder with a diameter of 80 mm) made of Pyrex (registered trademark) glass, as illustrated in FIG. 1. The polyvinyl chloride powder was a homopolymer of vinyl chloride monomers having the degree of polymerization of 1000 and was produced by a suspension polymerization method. The particle size distribution and mean particle size of the polyvinyl chloride powder were 25 to 600 μm and 140 μm, respectively, both of which were measured by a laser diffraction/scattering particle size distribution analyzer (LA-950, manufactured by HORIBA, Ltd.). The circulation pump 2 was activated to circulate the flow at a circulation flow rate of 90.4 L/min, thereby fluidizing the mixture 11 of the polyvinyl chloride and the inorganic filler. The circulation flow rate was measured by the circulation flowmeter 10. Then, the temperature of the mixture 11 was adjusted to 50° C. with the heat exchanger tube 3 located in the reactor 1. Subsequently, the nitrogen supply valve 4 and the exhaust valve 5 were opened so that the atmosphere in the reactor 1 was replaced by 100 vol % of nitrogen at a flow rate of 1 L/min for 30 minutes, while the internal pressure of the reactor 1 was adjusted to 10 kPa. Thereafter, the nitrogen supply valve 4 was closed and the chlorine supply valve 6 was opened so that the atmosphere in the reactor 1 was replaced by 100 vol % of chlorine gas at a flow rate of 1 L/min for 30 minutes, while the internal pressure of the reactor 1 was adjusted to 10 kPa. The chlorine was supplied from the chlorine gas cylinder 30 equipped with the pressure regulator 31, and the flow rate of the chlorine was measured by the flowmeter 32. The nitrogen was supplied from the nitrogen gas cylinder 40 equipped with the pressure regulator 41, and the flow rate of the nitrogen was measured by the flowmeter 42. The gas discharged through the exhaust valve 5 was treated in the chlorine removal equipment (not shown). Next, the UV LED light source 7 (having 20 UV-LED devices, NVSU233A, peak wavelength: 365 nm, manufactured by Nichia Corporation) was turned on. The UV LED light source 7 was installed on the side face of the reactor 1 and irradiated the mixture 11 of the polyvinyl chloride powder and the inorganic filler with UV light. Thus, a chlorination reaction was initiated. The irradiation intensity of the UV light per kg of the polyvinyl chloride powder was set to 0.01 W. Specifically, the irradiation area of the UV light on the inner wall of the reactor 1 was 10 cm$^2$ per kg of the polyvinyl chloride, and the irradiation intensity per unit area of the UV light was 1 mW/cm$^2$. In this case, a UV impermeable vinyl tape had previously been attached to some part of the outer wall of the reactor 1, so that the irradiation area of the UV light was adjusted. During the chlorination reaction, the temperature in the reactor 1 was continuously measured by the thermocouple 8 which was placed in the mixture of the polyvinyl chloride and the inorganic filler. The temperature in the reactor 1 was adjusted to 70° C. by passing cooling water through the heat exchanger tube 3. The emission gas 23 was discharged from the outlet of the reactor 1 and contained hydrogen chloride and chlorine. The emission gas 23 was transferred to the hydrogen chloride absorption vessel 20 containing 5 L of water 22. Accordingly the hydrogen chloride was absorbed by the water 22, and the concentration of the hydrogen chloride was continuously measured by an electrical conductivity meter 21 (ME-112T type, manufactured by DKK-TOA CORPORATION). Thus, the weight of the hydrogen chloride that was produced during the chlorination reaction was calculated. Based on the weight of the hydrogen chloride produced during the chlorination reaction and the weight of the polyvinyl chloride powder charged in the reactor 1, the chlorination reaction rate was calculated and continuously determined. The chlorine gas was automatically replenished through the chlorine supply valve 6 after it had been consumed in the chlorination reaction, while the internal pressure of the reactor 1 was adjusted to 10 kPa with the internal pressure regulating valve 9. When the chlorination reaction rate reached 53.0%, the UV LED light source 7 was turned off and the chlorination reaction was finished. After the completion of the chlorination reaction, the flow of the chlorine gas was stopped, and the nitrogen supply valve 4 and the exhaust valve 5 were opened so that the atmosphere in the reactor 1 was replaced by nitrogen at a flow rate of 1 L/min for 30 minutes. Thus, the residual chlorine gas in the reactor 1 and the chlorine and hydrogen chloride adsorbed on the resin were removed by washing. Consequently, the chlorinated polyvinyl chloride was taken out. The wavelength range of the UV LED (UV-LED devices, NVSU233A, manufactured by Nichia Corporation) used in this experiment was 350 to 400 nm. The total of the radiant energy of the UV light in the wavelength range of 280 to 420 nm was approximately 100% of the total of the radiant energy of light in the wavelength range of 150 to 600 nm.

Examples 2 to 6

Chlorinated polyvinyl chloride was produced under the same conditions as Example 1 except that the amount of silica added to 100 parts by weight of the polyvinyl chloride powder was set to the value shown in Table 1.

Examples 7 to 8

Chlorinated polyvinyl chloride was produced under the same conditions as Example 1 except that the inorganic filler was silica with a mean particle size of 50 nm (product name: "YA050C-SP3"), manufactured by Admatechs Company Limited, and the amount of silica added to 100 parts by weight of the polyvinyl chloride powder was set to the value shown in Table 1.

Example 9

Chlorinated polyvinyl chloride was produced under the same conditions as Example 6 except that the inorganic filler was silica with a mean particle size of 100 nm (product name: "YC100C-SP3"), manufactured by Admatechs Company Limited.

Example 10

Chlorinated polyvinyl chloride was produced under the same conditions as Example 6 except that the inorganic filler was silica with a mean particle size of 500 nm (product name: "SC2500-SQ"), manufactured by Admatechs Company Limited.

Examples 11 to 13

Chlorinated polyvinyl chloride was produced under the same conditions as Example 1 except that the inorganic filler was carbon black (product name: "MA100", mean particle size: 24 nm, manufactured by Mitsubishi Chemical Corporation), and the amount of carbon black added to 100 parts by weight of the polyvinyl chloride powder was set to the value shown in Table 1.

Examples 14 to 15

Chlorinated polyvinyl chloride was produced under the same conditions as Example 1 except that the inorganic filler was talc (product name: "D-800", mean particle size: 800 nm, manufactured by Nippon Talc Co., Ltd.), and the amount of talc added to 100 parts by weight of the polyvinyl chloride powder was set to the value shown in Table 1.

Examples 16 to 18

Chlorinated polyvinyl chloride was produced under the same conditions as Example 1 except that the inorganic filler was talc (product name: "FG-15", mean particle size: 1500 nm, manufactured by Nippon Talc Co., Ltd.), and the amount of talc added to 100 parts by weight of the polyvinyl chloride powder was set to the value shown in Table 1.

Example 19

Chlorinated polyvinyl chloride was produced under the same conditions as Example 1 except that the inorganic filler was talc (product name: "P-3", mean particle size: 5000 nm, manufactured by Nippon Talc Co., Ltd.), and the amount of talc added to 100 parts by weight of the polyvinyl chloride powder was set to the value shown in Table 1.

Example 20

Chlorinated polyvinyl chloride was produced under the same conditions as Example 1 except that the inorganic filler was talc (product name: "FH105", mean particle size: 5000 nm, manufactured by Fuji Talc Industrial Co., Ltd.), and the amount of talc added to 100 parts by weight of the polyvinyl chloride powder was set to the value shown in Table 1.

Example 21

Chlorinated polyvinyl chloride was produced under the same conditions as Example 1 except that the inorganic filler was talc (product name: "FG105", mean particle size: 5000 nm, manufactured by Fuji Talc Industrial Co., Ltd.), and the amount of talc added to 100 parts by weight of the polyvinyl chloride powder was set to the value shown in Table 1.

Comparative Example 1

Chlorinated polyvinyl chloride was produced in the same manner as Example 1 except that the inorganic filler was not added.

Comparative Example 2

Chlorinated polyvinyl chloride was produced under the same conditions as Example 6 except that the inorganic filler was calcium carbonate with a mean particle size of 80 nm (product name: "HAKUENKA CCR"), manufactured by Shiraishi Kogyo Kaisha, Ltd.

Comparative Example 3

Chlorinated polyvinyl chloride was produced under the same conditions as Example 6 except that the inorganic filler was calcium carbonate with a mean particle size of 100 nm (product name: "Vigot-10"), manufactured by Shiraishi Kogyo Kaisha, Ltd.

Comparative Example 4

Chlorinated polyvinyl chloride was produced under the same conditions as Example 6 except that the inorganic filler was titanium (IV) oxide, Rutile form (guaranteed reagent for JIS) with a mean particle size of 200 nm, manufactured by KANTO CHEMICAL CO., INC.

Example 22

The reaction apparatus 200 in FIG. 2 was used. First, 187.5 g (100 parts by weight) of polyvinyl chloride powder was mixed with 937.5 mg (0.5 parts by weight) of silica (product name: "YC010C-SP3", mean particle size: 10 nm, manufactured by Admatechs Company Limited) as an inorganic filler. The mixture was filled in a reactor 201 (1 L eggplant flask made of Pyrex (registered trademark) glass). The polyvinyl chloride powder was the same as that used in Example 1. The reactor 201 was immersed in hot water in a thermostatic bath 203. The hot water in the thermostatic bath 203 was maintained at 60° C. while it was stirred with a stirrer 204. Then, the reactor 201 was rotated in the direction of the arrow by a rotary evaporator (not shown). Subsequently a nitrogen supply valve 4 was opened to let nitrogen into the space of the reactor 201 at a flow rate of 200 mL/min for 60 minutes. Thereafter, the nitrogen supply valve 4 was closed and a chlorine supply valve 6 was opened to let 100 vol % of chlorine gas into the space of the reactor 201 at a flow rate of 200 mL/min for 30 minutes. After 30 minutes, the flow rate of the chlorine gas was increased to 600 mL/min, and a 400 W high pressure mercury lamp 205 (product name: "Handy 400", model number: HLR400T-1, manufactured by SEN LIGHTS Corporation) was turned on. The high pressure mercury lamp 205 was installed at the position 35 cm away from the surface of the reactor 201 and irradiated the mixture 202 of the polyvinyl chloride powder and the inorganic filler with UV light. Thus, a chlorination reaction was initiated. During the chlorination reaction, the temperature of the mixture 202 was continuously measured by a thermocouple 206 which was placed in the mixture 202. The irradiation area of the UV light on the inner wall of the reactor 201 was 502 cm$^2$ per kg of the polyvinyl chloride powder, and the irradiation intensity per unit area of the UV light was 16.7 mW/cm$^2$. Therefore, the irradiation intensity of the UV light per kg of the polyvinyl chloride powder was 8.4 W. The high pressure mercury lamp emitted light having a wavelength of more than 420 nm in addition to the UV light in the wavelength range of 280 to 420 nm. However, as described above, the irradiation intensity per unit area of the UV light in the wavelength range of 280 to 420 nm was calculated as the irradiation intensity per unit area of the UV light. Thus in this experiment, the irradiation intensity of the UV light per kg of the polyvinyl chloride was 8.40 W. Emission gas 23 was discharged from the reactor 201 and contained hydrogen chloride and chlorine. The emission gas 23 was transferred to a hydrogen chloride absorption vessel 20 containing 5 L of water 22. Accordingly, the hydrogen chloride was absorbed by the water 22, and the concentration of the hydrogen chloride was continuously measured by an electrical conductivity meter 21 (ME-112T type, manufactured by DKK-TOA CORPORATION). Thus, the weight of the hydrogen chloride that was produced during the chlorination reaction was calculated. Based on the weight of the hydrogen chloride produced during the chlorination reaction and the weight of the polyvinyl chloride charged in the reactor, the chlorination reaction rate was calculated and continuously determined. Emission gas 50 generated after the hydrogen chloride was absorbed by the water was removed in chlorine removal equipment (not shown). When the chlorination reaction rate reached 53.0%, the high pressure mercury lamp 205 was turned off and the chlorination reaction was finished. After the completion of the chlorination reaction, the flow of the chlorine gas was stopped, and nitrogen gas was introduced at a flow rate of 600 mL/min for 100 minutes so that the chlorine was replaced by the nitrogen gas. Consequently, the chlorinated polyvinyl chloride was taken out. In the spectral radiant energy distribution of the 400 W high pressure mercury lamp (product name: "Handy 400", model number: HLR400T-1, manufactured by SEN LIGHTS Corporation), the total of the radiant energy of the UV light in the wavelength range of 280 to 420 nm was 51% of the total of the radiant energy of light in the wavelength range of 150 to 600 nm.

Comparative Example 5

Chlorinated polyvinyl chloride was produced in the same manner as Example 22 except that the inorganic filler was not added.

In Examples 1 to 13, 22 and Comparative Examples 2 to 4, the mean particle size of the inorganic filler indicates a particle size at 50% in the cumulative particle size distribution based on volume, which is obtained by dispersing a powder of the inorganic filler (silica, carbon black, calcium carbonate, or titanium oxide) in water and measuring it with a dynamic light scattering particle size distribution analyzer (UPA-150, manufactured by NIKKISO CO., LTD.). In Examples 14 to 21, the mean particle size of the inorganic filler indicates a particle size at 50% in the cumulative particle size distribution based on volume, which is obtained by dispersing a powder of the inorganic filler (talc) in water and measuring it with a laser diffraction/scattering particle size distribution analyzer (LA-950, manufactured by HORIBA, Ltd.).

Table 1 shows the reaction time required for the chlorination reaction rate to reach 53% in Examples 1 to 22 and Comparative Examples 1 to 5.

TABLE 1

| | | Inorganic filler | | | | | |
|---|---|---|---|---|---|---|---|
| | Type | Manufacturer | Product name | Mean particle size (nm) | Added amount (parts by weight) | Reaction time (min) | Reaction apparatus |
| Ex. 1 | silica | Admatechs | YC010C-SP3 | 10 | 0.005 | 125 | FIG. 1 |
| Ex. 2 | silica | Admatechs | YC010C-SP3 | 10 | 0.01 | 113 | FIG. 1 |
| Ex. 3 | silica | Admatechs | YC010C-SP3 | 10 | 0.05 | 100 | FIG. 1 |
| Ex. 4 | silica | Admatechs | YC010C-SP3 | 10 | 0.1 | 100 | FIG. 1 |
| Ex. 5 | silica | Admatechs | YC010C-SP3 | 10 | 0.5 | 100 | FIG. 1 |
| Ex. 6 | silica | Admatechs | YC010C-SP3 | 10 | 1 | 100 | FIG. 1 |
| Ex. 7 | silica | Admatechs | YA050C-SP3 | 50 | 0.1 | 125 | FIG. 1 |
| Ex. 8 | silica | Admatechs | YA050C-SP3 | 50 | 1 | 100 | FIG. 1 |
| Ex. 9 | silica | Admatechs | YC100C-SP3 | 100 | 1 | 117 | FIG. 1 |
| Ex. 10 | silica | Admatechs | SC2500-SQ | 500 | 1 | 123 | FIG. 1 |
| Ex. 11 | carbon black | Mitsubishi Chemical | MA100 | 24 | 0.02 | 108 | FIG. 1 |
| Ex. 12 | carbon black | Mitsubishi Chemical | MA100 | 24 | 0.1 | 100 | FIG. 1 |
| Ex. 13 | carbon black | Mitsubishi Chemical | MA100 | 24 | 1 | 100 | FIG. 1 |
| Ex. 14 | talc | Nippon Talc | D-800 | 800 | 0.01 | 120 | FIG. 1 |
| Ex. 15 | talc | Nippon Talc | D-800 | 800 | 1 | 100 | FIG. 1 |
| Ex. 16 | talc | Nippon Talc | FG-15 | 1500 | 0.01 | 125 | FIG. 1 |
| Ex. 17 | talc | Nippon Talc | FG-15 | 1500 | 0.1 | 117 | FIG. 1 |
| Ex. 18 | talc | Nippon Talc | FG-15 | 1500 | 1 | 100 | FIG. 1 |
| Ex. 19 | talc | Nippon Talc | P-3 | 5000 | 1 | 115 | FIG. 1 |
| Ex. 20 | talc | Fuji Talc | FH105 | 5000 | 1 | 117 | FIG. 1 |
| Ex. 21 | talc | Fuji Talc | FG105 | 5000 | 1 | 115 | FIG. 1 |
| Comp. Ex. 1 | none | — | — | — | — | 130 | FIG. 1 |
| Comp. Ex. 2 | calcium carbonate | Shiraishi Kogyo | HAKUENKA CCR | 80 | 1 | 130 | FIG. 1 |
| Comp. Ex. 3 | calcium carbonate | Shiraishi Kogyo | Vigot-10 | 100 | 1 | 130 | FIG. 1 |
| Comp. Ex. 4 | titanium (IV) oxide, Rutile form | Kanto Chemical | Guaranteed reagent | 200 | 1 | 130 | FIG. 1 |
| Ex. 22 | silica | Admatechs | YC010C-SP3 | 10 | 0.5 | 138 | FIG. 2 |
| Comp. Ex. 5 | none | — | — | — | — | 180 | FIG. 2 |

As shown in Table 1, based on the comparison between Examples 1 to 21 and Comparative Example 1 and the comparison between Example 22 and Comparative Example 5, it was confirmed that the reaction time required to reach a predetermined chlorination reaction rate under the same conditions of the chlorination reaction was reduced and the productivity was improved in the examples in which the polyvinyl chloride powder was mixed with at least one inorganic filler selected from the group consisting of silica, carbon black, and talc.

On the other hand, the reaction time in Comparative Examples 2 to 4, in which calcium carbonate or titanium oxide was used as the inorganic filler, was the same as that in Comparative Example 1, in which the inorganic filler was not used. Thus, a reduction in the reaction time of the chlorination reaction was a particular effect achieved by performing the chlorination reaction of the polyvinyl chloride powder that was mixed with at least one inorganic filler selected from the group consisting of silica, carbon black, and talc.

In a chlorinated polyvinyl chloride composition, silica is generally added to increase the amount of resin or to improve the impact strength, carbon black is generally added as a pigment, and talc is generally added to improve the impact strength and the heat resistance. Therefore, the chlorinated polyvinyl chloride obtained by the production method according to one or more embodiments of the present invention can further be used for additional processing, molding, etc. without any need to separate or remove the inorganic filler. In such a case, the type and amount of the inorganic filler to be added in the chlorination reaction can be appropriately selected in accordance with the purpose of processing or molding. For example, it may be preferable that the chlorination reaction is performed by mixing 0.001 to 1 parts by weight of the inorganic filler with respect to 100 parts by weight of the polyvinyl chloride powder.

Although the disclosure has been described with respect to only a limited number of embodiments, those skilled in the art, having benefit of this disclosure, will appreciate that various other embodiments may be devised without departing from the scope of the present invention. Accordingly the scope of the present invention should be limited only by the attached claims.

| Description of Reference Numerals | |
| --- | --- |
| 1 | Fluidized bed reactor |
| 2 | Circulation pump |
| 3 | Heat exchanger tube |
| 4 | Nitrogen supply valve |
| 5 | Exhaust valve |
| 6 | Chlorine supply valve |
| 7 | UV LED light source |
| 8, 206, 305 | Thermocouple |
| 9 | Internal pressure regulating valve |
| 10, 32, 42 | Flowmeter |
| 11, 202, 302 | Mixture of polyvinyl chloride powder and inorganic filler |
| 20 | Hydrogen chloride absorption vessel |
| 21 | Electrical conductivity meter |
| 22 | Water |
| 23, 50 | Emission gas |
| 30 | Chlorine gas cylinder |

| Description of Reference Numerals | |
| --- | --- |
| 31, 41 | Pressure regulator |
| 40 | Nitrogen gas cylinder |
| 100, 110, 200, 300 | Reaction apparatus |
| 201 | Reactor (eggplant flask) |
| 203 | Thermostatic bath |
| 204 | Stirrer |
| 205, 304 | High pressure mercury lamp |
| 301 | Reactor (made of Hastelloy C22) |
| 303 | Temperature control jacket |

What is claimed is:

1. A method for producing chlorinated polyvinyl chloride, comprising:
   bringing chlorine gas into contact with a mixture comprising 100 parts by weight of a polyvinyl chloride powder and 0.001 to 1 parts by weight of at least one inorganic filler; and
   irradiating the mixture with UV light to perform a chlorination reaction,
   wherein the at least one inorganic filler is selected from the group consisting of silica, carbon black, and talc.

2. The method according to claim 1, wherein the at least one inorganic filler is selected from the group consisting of: silica having a mean particle size of 1 to 500 nm; and carbon black having a mean particle size of 1 to 500 nm.

3. The method according to claim 1, wherein the at least one inorganic filler is talc that has a mean particle size of 500 to 5000 nm.

4. The method according to claim 1, wherein the polyvinyl chloride powder has a mean particle size of 25 to 2500 µm.

5. The method according to claim 2, wherein the polyvinyl chloride powder has a mean particle size of 25 to 2500 µm.

6. The method according to claim 3, wherein the polyvinyl chloride powder has a mean particle size of 25 to 2500 µm.

7. The method according to claim 1, further comprising placing the mixture in a fluidized bed reactor prior to bringing the chlorine gas into contact with the mixture, wherein the mixture is irradiated in the fluidized bed reactor.

* * * * *